United States Patent [19]

Meek et al.

[11] 3,782,195
[45] Jan. 1, 1974

[54] TEMPERATURE INDICATING VESSEL
[76] Inventors: John S. Meek, 14 Outrigger St., Venice, Calif.; J. Roy Nelson, 8741 Shoreham Dr., Los Angeles, Calif. 90069
[22] Filed: May 25, 1972
[21] Appl. No.: 256,746

[52] U.S. Cl. ............... 73/343 B, 40/324, 73/358, 116/114 V
[51] Int. Cl. ............... G01d 11/26, G01k 5/00
[58] Field of Search ............... 73/343 B, 356, 358; 215/11 A; 116/114 V, 114 AM; 99/192 TT; 40/324, 326; 35/19

[56] References Cited
UNITED STATES PATENTS
3,135,118   6/1964   Zlobin ............................ 73/343 B
3,524,726   8/1970   DeKoster ........................ 73/356 X
3,047,405   7/1962   Lanier ............................ 116/114 V
2,216,127   10/1940   McNaught ...................... 73/358 X Primary Examiner—Richard C. Queisser
Assistant Examiner—Daniel M. Yasich
Attorney—Charles G. Lyon et al.

[57] ABSTRACT

An open vessel having a sealed chamber in a sidewall thereof. The chamber is filled with a liquid having a predetermined freezing point so that upon filling the vessel with a liquid, the temperature of that liquid is indicated relative to the freezing point of the liquid held in said chamber by the change of state of said liquid within said chamber.

18 Claims, 9 Drawing Figures

PATENTED JAN 1 1974  3,782,195

TEMPERATURE INDICATING VESSEL

BACKGROUND OF THE INVENTION

There are several instances in which it would be desirable to know the approximate temperature of a liquid in a glass or other open vessel. Many such instances are the result of real and practical considerations, while others relate to novelty situations. The practical considerations are present during the conducting of laboratory experiments, developing photographic film or preparing foods. Of course, a common mercury thermometer could be used to give the exact temperature, but often times exact temperatures are not necessary and one does not wish to be bothered with having to place a thermometer in the liquid and await a reading. In such cases, it would be quite helpful to have a vessel or glass which itself could give an approximate temperature reading. In addition, if such a vessel could provide this temperature information in a novel fashion, novelty drinking glasses and the like could be provided for both amusement and educational benefits which would result from an understanding of the principals involved.

It is therefore the principal object of this invention to provide an open vessel which gives temperature information with respect to the liquid held therein.

It is another object of this invention to provide a open vessel which provides temperature information in a new and novel fashion.

It is further object of this invention to provide an open vessel which provides temperature information while being illustrative of change of state.

These and other objects and advantages of the present invention will become apparent from the following detailed description taken in conjunction with the accompanying drawings.

SUMMARY OF THE INVENTION

Briefly, the invention consists of sealing a liquid in a sidewall of a vessel which liquid has a predetermined melting point, preferably about room temperature. Upon filling the vessel with a liquid below the freezing point of the sealed liquid, crystallization occurs within the sealed chamber thereby indicating the temperature of the liquid within the vessel with respect to the freezing point of the sealed liquid. Various configurations can be utilized with respect to the sealed liquid to provide interesting and novel effects upon crystallization thereof.

IN THE DRAWINGS

Figure 1:
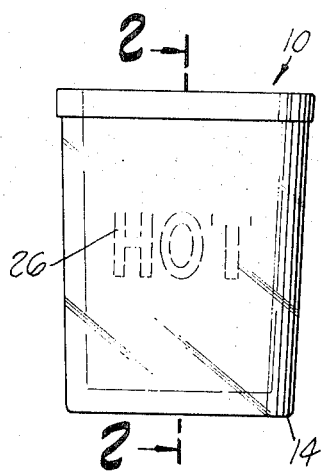
FIG. 1 is a side elevation of the first embodiment of the invention.
Figure 3:
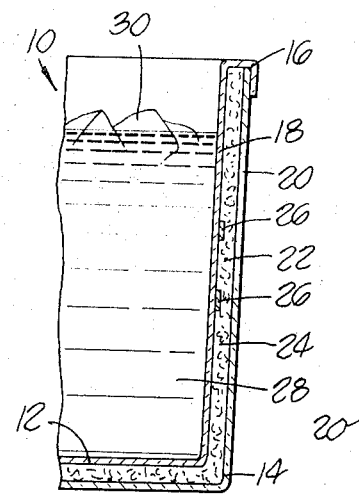
FIG. 3 is a partial sectional view of the first embodiment showing crystallization of the sealed liquid.
Figure 2:
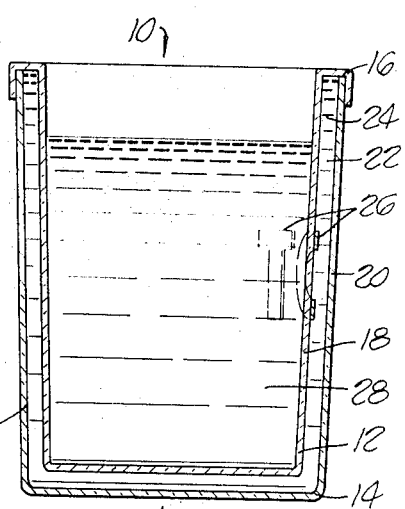
FIG. 2 is a cross-sectional view taken along lines 2—2 in FIG. 1.

Referring now in detail to the drawings, one embodiment a melting point within the desired range, the invention is shown in FIGS. 1–3. In this embodiment, the open vessel 10 is comprised of an inner housing 12 and outer housing 14, the outer housing being constructed of a clear material such as polystyrene. The two housings are sealed at their upper ends 16 thereby defining an inner wall 18, outer wall 20 and sealed chamber 22. Chamber 22 is filled with a non-toxic liquid 24 having a predetermined melting point, preferably near or about room temperature which ranges from about 70 to 75 degrees Fahrenheit. 1-dodecyl alcohol is a good example of such a liquid because in addition to having a melting point within the desired ramge, it is non-toxic, has a high boiling point and is of low flammability, making it completely safe for children as well as adults. Other alcohols and ethers such as phenyl ethers, having a low toxicity could also be used. The vessel 10 is provided with Characters or lettering 26 which is carried by the inner housing 12 on wall 18. The lettering shown in FIGS. 1 and 2 spells out the word "HOT." In the embodiment shown in FIG. 3, the letters 24 extend into chamber 22. As an alternative, the letters or other characters such as designs etc. could be painted on or otherwise secured to wall 18. FIGS. 1 and 2 illustrate how the lettering 26 is clearly visible through the liquid and translucent outer housing 14. It should be noted that by using a liquid such as 1-dodecyl alcohol, which has an index of refraction very close to that of the polystyrene used in the housings, the sealed chamber 22 is not readily visible, thereby further enhancing the appearance of vessel 10. In use, when the temperature of a liquid 28 in vessel 10 drops below the melting point of the alcohol or other liquid 24 within chamber 22, crystallization takes place in the sealed liquid 24. This is represented in FIG. 3, wherein ice cubes are included to illustrate a chilled liquid 28. Upon crystallization of the alcohol 24 or other liquid sealed within chamber 22, the lettering 26 is no longer visible due to the opaque crystals which form externally adjacent said lettering, thereby indicating that a chilled condition exists in the liquid 28 within vessel 10. Thus it can be seen that when a liquid in vessel 10 is at a desired temperature, either the letters so indicating can be seen on the inner wall of the vessel, which letters disappear when the liquid becomes too cold, or if a chilled liquid were desired, the letters would appear upon the liquid in question becoming too warm.

Figure 4:
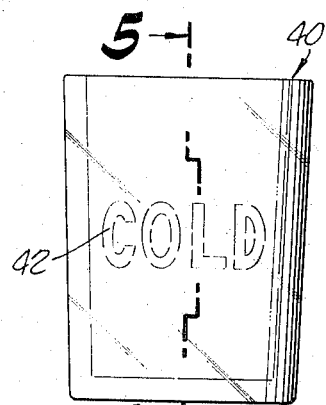
FIG. 4 is a side elevation of a second embodiment of the invention.
Figure 6:
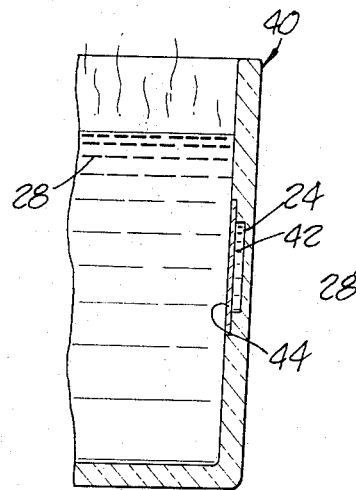
FIG. 6 is a partial sectional view of the second embodiment wherein the sealed liquid is in a liquid state.
Figure 5:
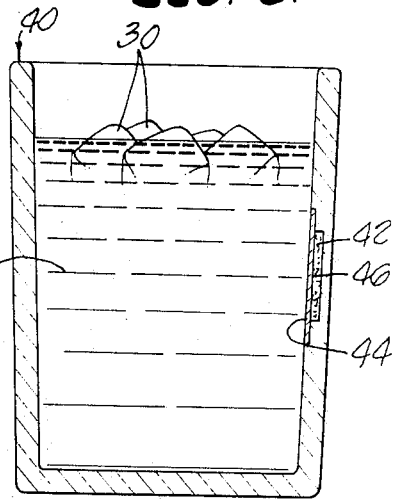
FIG. 5 is a sectional view taken along line 5—5 in FIG. 4 showing the sealed liquid in a crystallized state.

FIGS. 4–6 illustrate a second embodiment of the invention. This embodiment utilized a single walled vessel 40 having either a single or a plurality of chambers 42 cut therein, each chamber defining a letter or the like. In FIG. 4, four chambers 42 are cut in vessel 40, each defining a letter of the word "COLD." Chambers 42, as chamber 22 in the first embodiment are filled with 1-dodecyl alcohol 24 or other liquid having the characteristics set forth above. A sealing member 44 is provided to seal the alcohol or liquid 24 within chambers 42. As a result of the visual properties discussed above, when the temperature of the liquid 28 in vessel 40 is above the freezing point of the alcohol 24, the chambers 42 are hardly visible. However, when the temperature of the liquid in the vessel falls below the melting point of the alcohol [ice 30 again being shown in FIG. 5 to illustrate a chilled liquid] crystallization 46 occurs within the chambers 42 and the word "COLD" is seen to appear. If the liquid is then warmed, the word disappears, thereby serving as a temperature indicator with reference to the particular alcohol or ether used in chambers 42. It should be noted that various solutions might possibly be added to the alcohol 24, to slightly alter the melting point if so desired for particular applications. On the other hand, if a particular experiment called for a more extreme critical temperature (treater variance from room temperature), a different liquid would be employed having the appropriate melting point.

This second embodiment has particular adaptation for advertising in addition to those generally noted above. The chambers 40 could be cut to define the word "COKE," for example, and when the dark cold cola was poured into the vessel 40, the word would appear, each letter taking on the frosty appearance of the crystallized 1-dodecyl.

Figure 7:
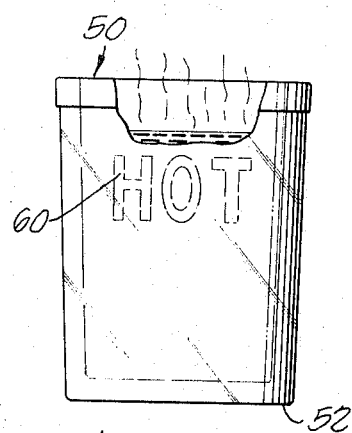
FIG. 7 is a frontal elevation of a third embodiment of the invention.
Figure 8:
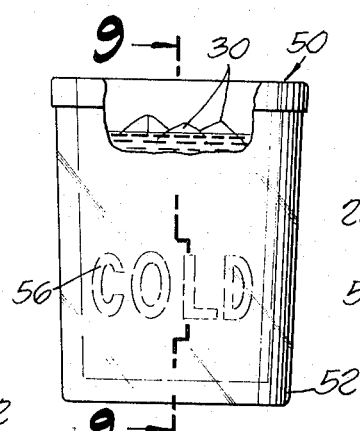
FIG. 8 is a frontal elevation of the third embodiment wherein the sealed liquid is in a crystallized state.
Figure 9:
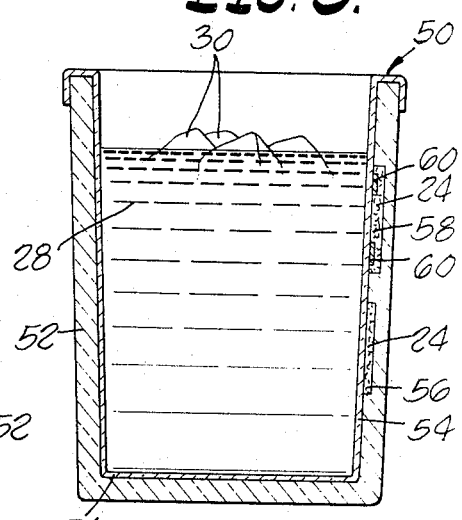
FIG. 9 is a cross-sectional view of the third embodiment taken along line 9—9 in FIG. 8.

The third embodiment of the invention is shown in FIG. 7-9. This embodiment in essence is a combination of the first two embodiments. The open vessel 50 is comprised of a translucent outer housing 52 and thin inner housing 54. Outer housing 52 has one or more lower chambers 56 cut therein which define letters or the like [spelling "COLD" in FIG. 8]just as chambers 42 in the second embodiment. In addition, the outer housing has an upper chamber 58 cut therein. Chambers 56 and 58 are filled with 1-dodecyl alcohol or other suitable liquid 24, as in the prior embodiments and sealed by means of the inner housing 54. Lettering 60 is carried by inner housing 54 and either faces or extends into chamber 58 similar to the lettering 26 in the first embodiment. In use, when the temperature of the liquid 28 in vessel 50 is above the melting point of the alcohol or other liquid 24 in chambers 56 and 58, the chambers are not readily visible due to the similarity of indices of refraction of the alcohol and polystyrene, and the letters 60 carried by the inner housing 54 are clearly visible. In FIG. 7, the letters 60 are seen to spell out the word "HOT." As the temperature of the alcohol drops below its melting point, as shown in FIGS. 8 and 9 [ice 30 again being used to indicate a chilled liquid 28]crystallization occurs. With the crystallization of the alcohol in the upper chamber 58, the opaque crystals cover the lettering and a frosty figure appears taking the shape of the upper chamber. While the chamber 58 is seen to be rectangular in FIGS. 8 and 9, different shapes could be used for asthetic or advertising purposes. In addition, as crystallization occurs in the lower chambers 56, the symbol or words defined thereby ["COLD" being illustrated in FIG. 8] is seen to appear in frosty letters against the background of the liquid 28, or that of inner housing 54, if an opaque inner housing were used. While chambers 58 and 56 have been referred to as upper and lower housings, it is understood that such a designation is for reference purposes only and relocation of the different changes or other various changes and modifications may be made in carrying out the present invention without parting from the scope and spirit thereof. Insofar as these changes and modifications are within the purview of the appended claims, they are to be considered as part of the invention.

What is claimed is:

1. A temperature indicating vessel comprising an open vessel adapted for holding a first liquid therein, said vessel having a wall portion, said wall portion having a sealed chamber therein, said chamber defining a character, an area of said wall portion externally adjacent said chamber being translucent, said chamber being substantially filled with a second liquid having a predetermined melting point so that upon the temperature of said liquid held in said vessel falling below the melting point of the second liquid in said sealed chamber, crystallization is caused to occur in said second liquid, said crystallization being externally visible through said translucent area of said wall portion and rendering said character visible and indicating the temperature of said first liquid being below the melting point of said second liquid.

2. The combination of claim 1 wherein said second liquid has a melting point within the range of about 55° to 85° Fahrenheit.

3. The combination of claim 2 including at least one character, said character being carried by said wall portion, internally adjacent said sealed chamber and visible through said translucent area and said second liquid within said sealed chamber prior to crystallization of said second liquid.

4. The combination of claim 1 wherein said second liquid has a melting point of about 75° Fahrenheit.

5. The combination of claim 4 wherein said second liquid has an index of refraction substantially equal to the index of refraction of said translucent area.

6. The combination of claim 4 including a plurality of said sealed chambers, each of said chambers defining a character said characters defining a word.

7. A temperature indicating vessel comprising an open vessel adapted for holding a first liquid therein, said vessel having a wall portion, said wall portion having a sealed chamber therein, an area of said wall portion externally adjacent said chamber being translucent, at least one character carried by said wall portion internally adjacent said sealed chamber and visible therethrough, said chamber being substantially filled with a second liquid having a predetermined melting point so that upon the temperature of said liquid held in said vessel falling below the melting point of the second liquid in said sealed chamber, crystallization is caused to occur in said second liquid, said crystallization being externally visible through said translucent area of said wall portion, thereby blocking the character carried by said inner wall portion from view and indicating the temperature of said first liquid as being below the melting point of said second liquid.

8. The combination of claim 7 wherein said second liquid has an index of refraction substantially equal to the index of refraction of said translucent area.

9. The combination of claim 7 including a plurality of said characters carried by said wall portion, said characters defining a word.

10. The combination of claim 9 wherein said second liquid is non-toxic and has a melting point of about 75° Fahrenheit.

11. The combination of claim 10 wherein said liquid is 1-dodecyl alcohol.

12. The combination of claim 7 wherein said sealed chamber defines a character.

13. The combination of claim 12 including a plurality of said chambers defining a character, said characters defining a word.

14. A temperature indicating vessel comprising an inner housing, a translucent outer housing, said inner and outer housings being sealed at the upper ends thereof, thereby defining an open vessel having an inner wall, translucent outer wall and sealed chamber therebetween and being adapted to hold a first liquid therein, said sealed chamber being substantially filled with a second liquid having a predetermined melting point and at least one character carried by said inner wall, said character being externally visible through said second liquid within said sealed chamber and said translucent outer housing, whereby upon the temperature of said first liquid held in said vessel falling below the melting point of the second liquid in said sealed chamber, crystallization is caused to occur in said second liquid, said crystallization being externally adjacent said character and visible through said translucent outer housing thereby covering said character and indicating the temperature of said first liquid being below the melting point of said second liquid.

15. The combination of claim 14 wherein said second liquid has a melting point within the range of about 55° to 85° Fahrenheit.

16. The combination of claim 15 wherein said second liquid has an index of refraction substantially equal to the index of refraction of said translucent area.

17. The combination of claim 16 wherein said second liquid has a melting point of about 75° Fahrenheit.

18. The combination of claim 17 including a plurality of characters defining a word.

* * * * *